United States Patent [19]

Nield et al.

[11] 4,334,217
[45] Jun. 8, 1982

[54] ELECTRONIC CONTROL INDICATOR FOR CABLE HOIST EQUIPMENT

[75] Inventors: Barry J. Nield, Calgary, Canada; Roy R. Earnshaw, Bakersfield, Calif.

[73] Assignee: Rig Electronics Ltd., Calgary, Canada

[21] Appl. No.: 146,327

[22] Filed: May 2, 1980

[51] Int. Cl.³ .............. B66B 3/02; E21B 45/00; G06B 3/02; G08B 19/00
[52] U.S. Cl. .................. 340/685; 33/136; 175/45; 212/153; 235/92 MP; 340/686
[58] Field of Search ............... 340/685, 686, 860, 861; 364/422, 562; 235/92 MP; 254/269, 270; 175/40, 45; 33/133, 136; 212/153

[56] References Cited

U.S. PATENT DOCUMENTS

| | | | |
|---|---|---|---|
| 2,623,387 | 12/1952 | Pitcher et al. | 340/860 X |
| 2,634,405 | 4/1953 | Van Stone et al. | 340/685 |
| 3,052,878 | 9/1962 | Berry | 340/686 |
| 3,651,871 | 3/1972 | Greene | 340/686 X |
| 3,750,130 | 7/1973 | Lute | 340/685 |
| 3,777,560 | 12/1973 | Guignard | 340/860 X |
| 3,796,322 | 3/1974 | Cording | 340/685 X |
| 4,114,435 | 9/1978 | Patton et al. | 364/562 X |
| 4,117,600 | 10/1978 | Guignard et al. | 364/562 X |
| 4,119,837 | 10/1978 | Sheldon et al. | 235/92 MP |
| 4,121,293 | 10/1978 | Kerr et al. | 340/685 X |

Primary Examiner—John W. Caldwell, Sr.
Assistant Examiner—Joseph E. Nowicki
Attorney, Agent, or Firm—Ade & Company

[57] ABSTRACT

A magnetic pick-up device or other electrical output type sensor is operatively situated adjacent to a rotary part of the cable hoist assembly and produces impulses as the part rotates. These are conveyed to electronic equipment which, by use of the necessary calculator networks and the like, displays information such as upper and lower limits or positions of the cable hook and may include automatic cut-off devices for the hoist equipment. Also available is a display showing the total distance travelled by the cable both upwardly and downwardly and means to indicate when a predetermined distance has been travelled. Electronic equipment can also indicate the distance the load travels so that the operator can determine the location of the load relative to a reference point. Furthermore, the rate of travel of the cable as it applies to the penetration of a drill bit can be indicated.

13 Claims, 7 Drawing Figures

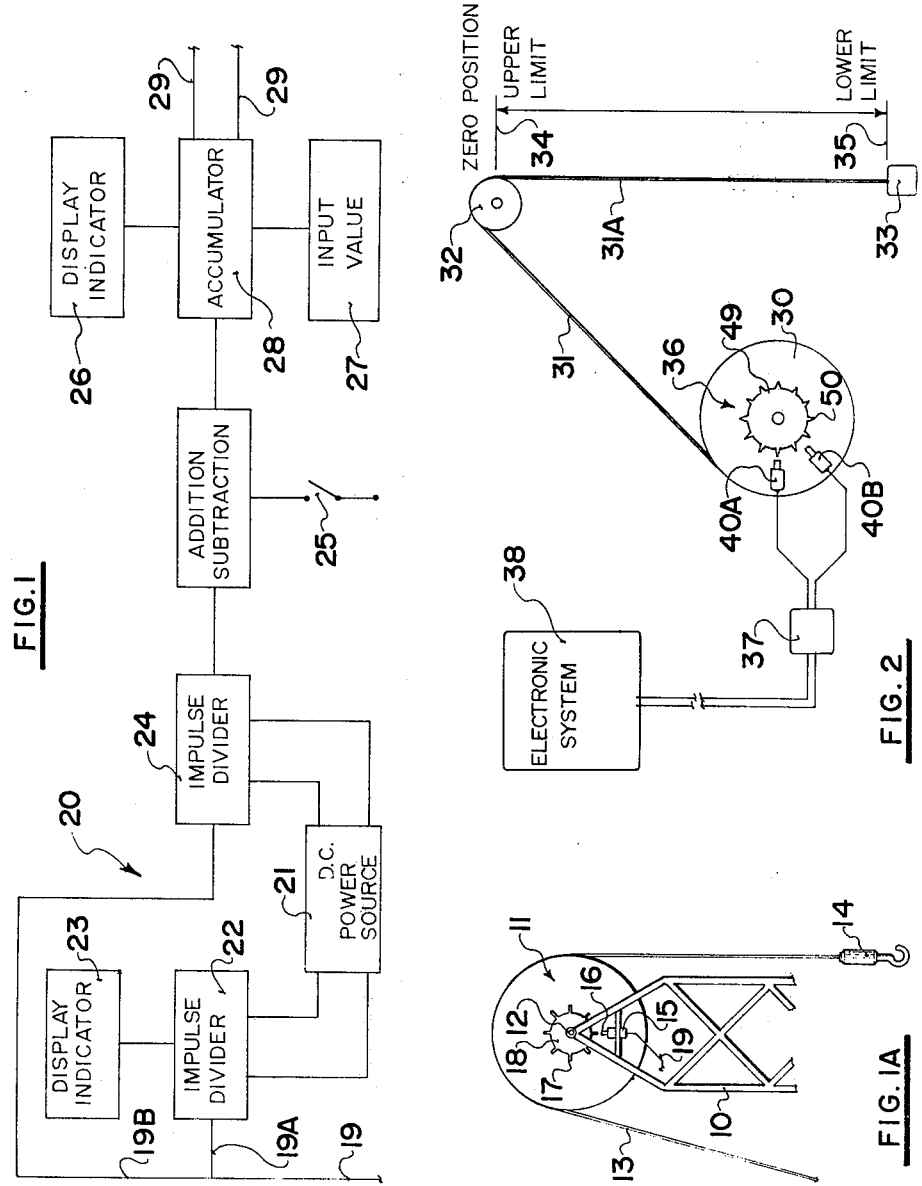

ELECTRONIC CONTROL INDICATOR FOR CABLE HOIST EQUIPMENT

BACKGROUND OF THE INVENTION

This invention relates to new and useful improvements in electronic control indicators for cable hoist equipment and can be used for the hoist equipment of cranes or general hoists and for hoists used in the raising and lowering of drill string and the rotating of drill bits down hole.

Such equipment can be operated in a manner such that the load carrying means or hook can be raised or lowered beyond a safe limit. This can result in equipment damage and/or present a hazard to personnel working on the equipment.

It is often not possible for the operator to see the position of the load carrying hook or, even when same is in sight, many other distractions occur so that the operator, inadvertently, exceeds the safe positions both upwardly and downwardly.

Such hoists may include a cable and winch system extending over a single top wheel and terminating in load carrying means such as a block or hook. Alternatively, hoisting devices used for raising and lowering heavy loads, normally use a stationary block consisting of several sheaves and a travelling block also consisting of several sheaves to which the load carrying means such as a hook, is attached. The cable from the "fast" sheave is passed around these sheaves on the stationary and travelling block and results in a greater length of cable passing over the "fast" sheave in order to allow the travelling block to move a relatively short distance.

It is also desirable in many instances to accurately determine total distance of travel by the hoist cable both upwardly and downwardly so that the cable can be replaced when this distance is reached.

Prior art devices known to the applicants include ton-mile indicators such as that illustrated and described in U.S. Pat. No. 3,884,071. However, this is an involved system which measures a combination of the distance travelled and the weight carried and is not usable for total up and down distance travelled by the cable neither is it usable for upper and lower load carrying means limits.

SUMMARY OF THE INVENTION

The present invention overcomes disadvantages inherent with such devices by providing means for producing pulses from a rotary element of the hoist mechanism and then providing electronic equipment which can measure the total distance travelled by the cable, the upper and lower limits of the load carrying hook or other means, and with certain additions, the position of the load suspended from the load carrying hook as, for example, the depth of a drill bit. Furthermore, the penetration speed at the bit can be indicated if desired and the exact position of the bit down hole.

In accordance with the invention there is provided indicating means for cable hoist equipment which includes a cable with load carrying means thereon and at least one rotating member which rotates in relation to the vertical movement of the load carrying means; comprising in combination at least one sensing means secured adjacent to said rotating member, means on said rotating member sensed by said sensing means as same passes adjacent said sensing means, said sensing means producing electric pulses, electronic means operatively connected to said sensing means to receive said pulses, impulse calculating means receiving said pulses and display indicating means operatively connected to said impulse calculating means.

A further aspect of the invention includes indicating means for cable hoist equipment which includes a cable with load carrying means thereon and at least one rotating member which rotates in relation to the vertical movement of the load carrying means; comprising in combination a pair of sensors secured in angular relationship with one another adjacent said rotating member, sensor actuating means co-axially mounted on said rotating member and being sensed by said sensors and producing electromagnetic pulses therein, and electronic means operatively connected to said sensors to receive the pulses therefrom, said electronic means including means to receive said pulses, and first means to translate said pulses and display same to indicate the total distance up and down travelled by the cable, second means to translate said pulses and display same to indicate the position of the load carrying means relative to a reference point such as the uppermost and lowermost position.

Another advantage of the invention is that additions to the electronic circuitry can be provided which will display signals if the upper and lower limits of the movement of the hook are exceeded, can automatically switch off the hoist equipment if these limits are exceeded, can provide means to over-ride the automatic cut-off devices, can indicate the total distance travelled by the cable and can indicate when a pre-set distance has been exceeded, can by means of a manually switched section, indicate the total depth reading of a bit in a bore hole, and can indicate the penetration rate in feet per minute or any other rate system desired.

Another aspect of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a schematic diagram of one embodiment of the electronic circuitry.

FIG. 1A is a schematic diagram of the "crown" section of a drilling rig.

FIG. 2 is a block schematic diagram of the preferred embodiment of the hoist controller.

In the drawings like characters of reference indicate corresponding parts in the different figures.

DETAILED DESCRIPTION

Figure 3:
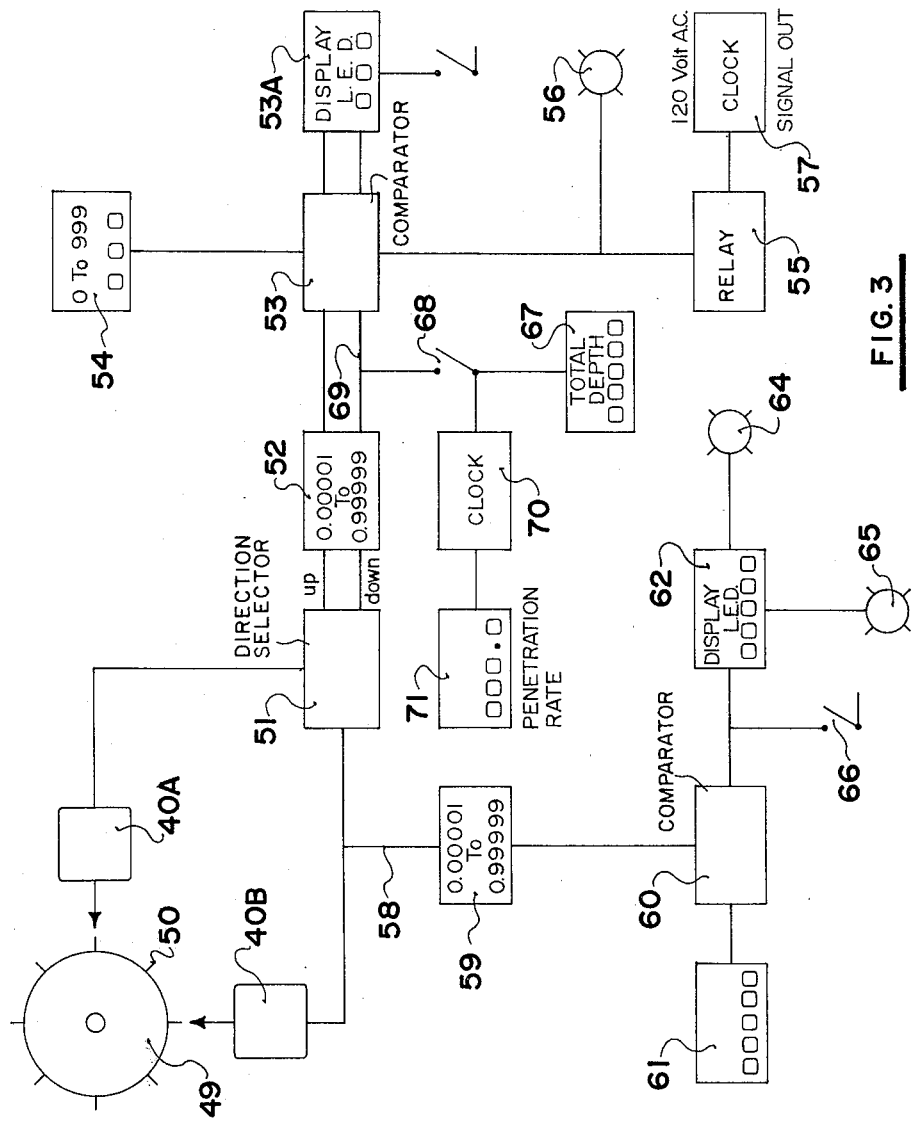
FIG. 3 is a block diagram of the electronic section of the preferred embodiment.

Dealing first with the embodiment shown in FIGS. 1 and 1A, this particular embodiment is designed specifically to prevent excess travel of the load carrying hook or element of the hoist and to the measurement of distance that the load cable travels, thereby permitting the operator to replace the cable after a certain distance has been reached. It can also be adapted to relate to the measurement of distance that the load travels in order to allow the operator to determine the location of the load relative to a reference point.

Dealing first with FIG. 1A, this shows supporting structure 10 supporting for rotation a "crown" wheel 11 of the hoist portion of a drilling rig, although it can be used in any hoist equipment such as cranes and the like.

This hoist wheel is journalled upon spindle 12 and is provided with cable 13 engaging thereover and being operatively connected to a winch system (not illustrated) which is conventional.

Load carrying means such as hook 14 is secured to the free end of the cable 13 all of which is conventional. The drawing is schematic and is not intended to show details which have been omitted for clarity. However, such construction is well known in the art to which it relates and it is therefore not believed necessary to show further details.

In this particular embodiment, a sensor such as a magnetic pick-up device 15 is provided secured to the supporting structure 10 and having a pick-up end 16 situated adjacent a plurality of ferro-magnetic sensor actuators such as set screws 17 or spokes engaged with in the perimeter of a disc 18 or the like co-axial with the fast sheave 11 and rotatable therewith. Alternatively, a photoelectric device (not illustrated) can be used to generate the necessary electric impulses.

The location of the set screws or spokes is such that a fixed number, for example, two, are placed so that two lines extended from the centre of the sheave and passing through the set screws or spokes, will exactly define a pre-determined distance of arc on the outer groove of the sheave. For example, a distance of one foot of arc may be indicated by the two set screws or spokes.

The magnetic pick-up device 15, which is conventional, is positioned so that the set screws or spokes on the rotating sheave pass next to the pick-up device and induce a magnetic impulse that is transmitted via cable 19 to the electronic section collectively designated 20 and shown in FIG. 1.

This is an electronic impulse counting device operating, in this embodiment, on low voltage D.C. such as 5 V, 12 V or 28 V from the power source 21.

A first impulse calculation circuit 22 is connected to the input 19 via line 19A and is also operatively connected to the D.C. power source 21 as shown. This calculation circuit converts impulses that are received to the appropriate distance value and the resulting value is displayed on a display indicator 23 which preferably takes the form of a light emitting diode device and this display is used by the operator to determine when the cable has travelled a total distance such that replacement of the cable is necessary because of wear.

The impulse signal from the magnetic pick-up also goes to a second impulse calculation circuit indicated by reference character 24 via connection 19B and this impulse calculation circuit is also operatively connected to the D.C. power source.

This calculation circuit is provided to calculate the feet or distance of travel of the load carrying hook 14.

As mentioned previously, hoisting devices for raising and lowering heavy loads often use a stationary block consisting of several sheaves and a travelling block also consisting of several sheaves to which the load carrying hook is attached.

The cable from the fast sheave 11 is passed around the sheaves on the stationary and travelling block and results in a considerable length of cable passing over the fast sheave in order to allow the travelling block to move a distance, for example, of one foot.

The number of impulses equivalent to one foot or any predetermined distance of travel of the load carrying hook are greater than the number of impulses equivalent to the same distance of travel of the cable of the fast sheave, because of the multiplier effect of the number of parts of line. The correct calculator value is determined based on the number of impulses for one unit of load carrying hook travel and this value is used to set the second calculation circuit 24.

The direction of travel of the load carrying hook 14 is established by a switch 25 that is operated by the operator. This switch is used to add distance when the load carrying hook is raised and the location of the load carrying hook is continuously displayed on a further indicating device 26 which also is preferably in the form of a light emitting diode indicator.

The travel limits of the load carrying hook are controlled by the input of a 0 value from an input device 27 which represents the maximum height of the raised load and a value dependent upon the height of the "crown" wheel 11 from the lowest working level which represents the minimum height of the load. If the aforementioned counting device reaches a 0 or the input value, a D.C. equality signal is transmitted from an accumulator 28, via lines 29 and this signal may be used to operate a solenoid air valve (not illustrated) which in turn applies a brake (not illustrated) to the main cable hoist. This signal can also disengage the prime mover for the hoist which may be an internal combustion engine or an electric motor.

The device may also be connected to a permanent recording device such as an electrically operated chart recorder or printing device (not illustrated) in order to provide a permanent record of the operation of the hoist assembly.

Reference should now be made to FIGS. 2-6 which show the preferred embodiment.

Reference character 30 illustrates a hoist drum with cable 31 extending therefrom and over a top or "crown" wheel assembly 32, the vertical portion 31A of the cable terminates in a block or load carrying element such as a hook indicated by reference character 33.

Line 34 illustrates what might be termed the 0 feet position (the upper limit of the block) and line 35, the lowermost limit of the block or load carrying element.

Sensing means collectively designated 36 are associated with the drum and general signals which, via transmitter 37, are conducted to the electronic system shown schematically in FIG. 2 by reference character 38.

In the first embodiment, the magnetic pick-up 15 is shown but, of course, it will be appreciated that in either of the embodiments, photoelectric sensing devices may be substituted using a light to activate the sensor with the light signal broken by the rotating wheel using spokes extending therefrom or, alternatively, an enclosed photoelectric sensing device operated by attachment through gearing or friction wheel can be used.

However, the embodiment disclosed in this application uses magnetic sensors of the type illustrated in FIG. 6, details of which will hereinafter be described.

It should also be noted that both embodiments depict the magnetic pick-ups or sensors on the main hoist drum. However, in actual installation, the pick-ups or sensors can be used on any of the rotating shaft involved in the cable movement and in which the rotation of the shaft or pulley is related to the distance travelled by the cable.

Figure 6:
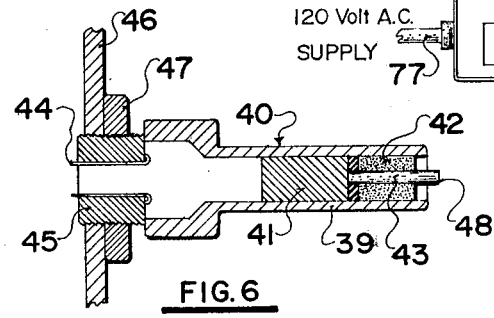
FIG. 6 is a cross sectional view of the preferred embodiment of one of the magnetic sensors.

FIG. 6 shows the magnetic sensor which is a non-contact transducer for converting mechanical motion into electrical energy.

They are capable of sensing any ferro-magnetic material having discontinuities therein such as gear teeth or slots and are available in two types, both analogue and digital, with the latter being an active device that contains its own amplifying and signal conditioning circuitry. Either type can be used in the present environment and FIG. 6 shows one form of construction. A cylindrical shell 39 encloses the sensor collectively designated 40 which includes a permanent magnet 41 therein, a coil 42 and a pole piece 43. The coil which consists of many turns of fine magnet wire is placed around the pole piece 43 as shown thus creating an external magnetic field in front of the sensor.

Connector pins 44 extend rearwardly and are operatively connected to the coil and these connector pins extend from the rear or connector end 45 which, in this embodiment is screw threaded and screw threadably engageable through a mounting plate 46 and held in the desired location by means of a lock nut 47 so that the distal end 48 of the pole piece may be positioned accurately relative to the ferro-magnetic gear wheel 49 which is used in this embodiment for the sensor activation. This gear wheel is provided with discontinuities which may consist of ferro-magentic sensor actuators such as gear teeth 50 so that when a gear tooth passing adjacent the distal end 48 of the pole piece, the magnetic field is disrupted and the flux change induces an A.C. voltage in the coil. This signal results each time a tooth or other ferrous discontinuities pass the pole piece and the amplitude of the signal is approximately proportional to the speed of the tooth passage or rate of change in the magnetic field when applied to analogue or passive magnetic sensors.

The digital sensors operate in a similar fashion except that signal amplification and conditioning is performed internally (not illustrated).

In the present embodiment as illustrated in FIGS. 2 and 3, a pair of such magnetic sensors is shown spaced angularly apart from one another and indicated by reference characters 40A and 40B. The pulses generated and transmitted to a direction selector 51 which determines the direction of rotation of the rotary member 49.

The direction of rotation is used to calculate the up or down movement of the main block in the derrick or the load carrying element 33. In order to convert the impulses to feet of travel or other units of travel, a selectable multiplier 52 is utilized thus enabling the device to be programmed for different types of drilling rigs, hoists and the like where the diameter of the "fast" sheave or the number of parts of line, varies.

The resultant converted signal is then fed to a first comparator 53 that is used to determine if a preset input value has been reached. Two limits are compared, firstly a 0 reference point and secondly, the input preset value from the input preset value section 54. The comparator is connected to a display section 53A preferably in the form of a light emitting diode display which shows the position of the block or load carrying element 53 as compared to a reference point such as the upper limit or 0 position illustrated in FIG. 2 by reference character 34.

If either of these conditions are met, a signal is produced to activate an electric relay 55 which in turn may operate a shut-down device on the drilling rig (not illustrated).

At the same time an indicator display 56, preferably red, will be activated by the output signal.

Also included is an operator selectable by-pass clock 57 which allows the operator to run the drilling rig or hoist, if conditions require operation of the main block or load carrying element, past the preset limits. This clock will reset the shut-down system after the time has expired, to prevent damage to the rig due to operator error.

A second feature of the device is to calculate total movement of the cable over the "fast" sheave, in order to allow the operator to replace the cable when the distance travelled exceeds the predetermined safety limit.

This feature utilizes the total impulses for both directions of rotation by sensing the impulses from one magnetic sensor prior to direction selection via line 58 which leads to a selectable multiplier 59 to convert the impulses to linear feet of cable movement (or any other unit of measurement) said multiplier being selectable by the operator.

This leads to a further comparator 60 which also has an input preset value module 61 connectable thereto and an indicator 62 which preferably takes the form of a light emitting diode display. A display light such as a green light 64 is connected to the display until the preset value is reached whereupon a further display light such as a red light 65 is illuminated. A reset switch 66 is provided to reset the display.

Also shown in FIG. 3 is a read-out device 67 connectable to the circuit by means of a manually operated switch 68, between the multiplier 52 and the comparator 53 and connected to the "down" lead 69.

When the switch 68 is closed, it will report the depth (or down signal) of the drill bit and the switch is an essential part of this circuit so that the depth reading meter 67 can be disconnected when the drilling operation is suspended and additional drill pipe is being added or when the main block assembly is picking up or setting down non-related items. The read-out will retain the last position recorded and upon closing the switch, the read-out is reactivated to add additional distance thereto.

A clock with display 70 is also connected to the line leading to the total depth reading display which may be used to convert the penetration of the drill bit in unit measurement per unit time, for example, two feet per minute which in turn is displayed on a penetration rate display 71.

The total depth reading display 67, together with switch 68 enables the operator to locate, by lowering drill pipe into the hole after replacing the drill bit, the total depth of the hole, with extreme accuracy.

Figure 4:
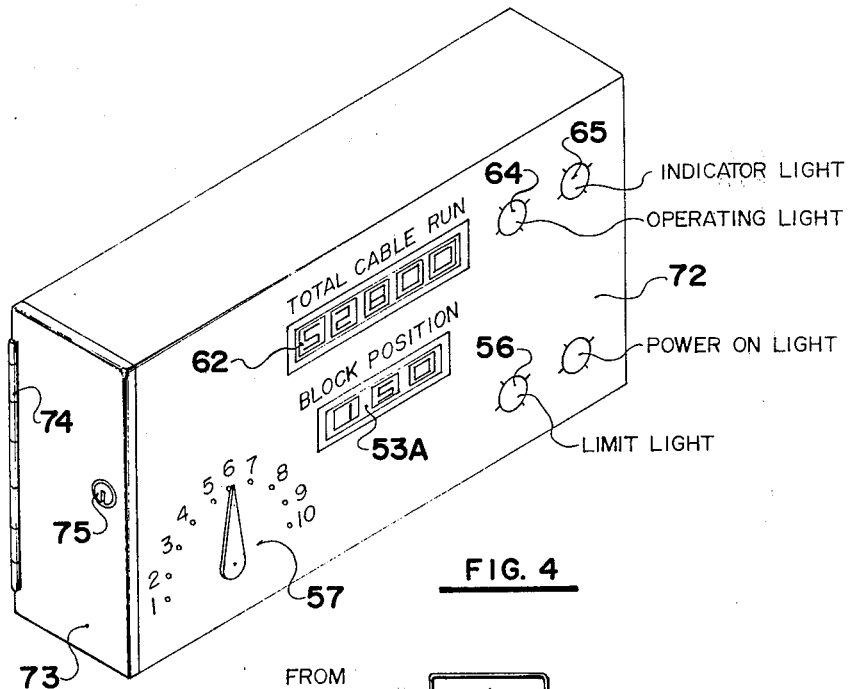
FIG. 4 is an isometric view of one embodiment of the casing showing the front display panel.
Figure 5:
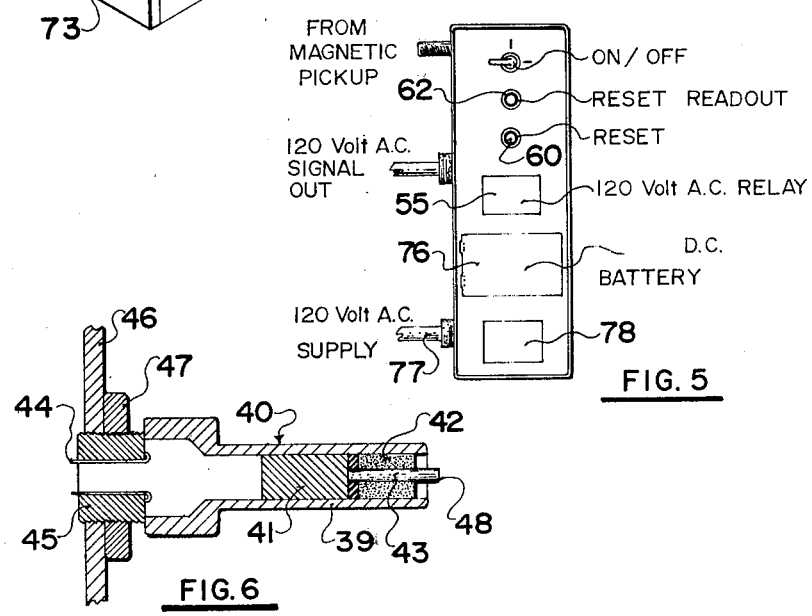
FIG. 5 is an end view of FIG. 4 with the end of the casing removed.

FIGS. 4 and 5 show a typical enclosure for the electronic system with the various display items illustrated on the front panel 72. An end part 73 of the casing, hinged by hinge pins 74, and locked by lock 75, encloses the various components shown in FIG. 5 which includes a D.C. battery pack shown schematically by reference character 76. This electronic circuit may be supplied by 120 VAC supply 77 for charging the battery pack and includes a D.C. power supply and battery charger shown schematically by reference character 78. It will also be appreciated that the switch 68 can be replaced by means that automatically isolates and reconnects the device for total depth.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. Indicating means for cable hoist equipment which includes a cable with load carrying means on the free end thereof movable between an uppermost position and a lowermost position and vice versa and at least one rotating member which rotates in relation to the vertical movement of the load carrying means; comprising in combination a pair of sensors secured in spaced angular relationship with one another adjacent said rotating member, sensor actuating means co-axially mounted on said rotating member and being sensed by said sensors and producing electromagnetic pulses therein, and electronic means operatively connected to said sensors to receive the pulses therefrom, said electronic means including means to receive said pulses, first means to translate said pulses and display same to indicate the total distance up and down travelled by the cable and second means to translate said pulses to indicate the position of the load carrying means relative to a reference point such as the uppermost and lowermost positions.

2. The device according to claim 1 which includes means to pre-select a total distance travelled by said cable and including first indicating means to indicate when said total distance has been travelled, said means to pre-select a total distance travelled by said cable including an adjustable input device, said first means to translate said pulses and display same including a comparator, said adjustable input device being operatively connected to said comparator, said pulses also being operatively connected to said comparator, and second indicating means operatively connected to said first indicating means operable when said pre-selected distance travelled by said cable, has been reached.

3. The invention according to claim 2 which includes means to pre-select the uppermost and lowermost positions of said load carrying means, said last mentioned means including an adjustable input device, said second means to translate said pulses and display same including a further comparator, said adjustable input device being operatively connected to said further comparator, said pulses also being operatively connected to said further comparator, said pulses from both of said sensors being operatively connected independently to said further comparator and further indicating means operable when said pre-selected uppermost and lowermost positions are reached by said load carrying means.

4. The invention according to claim 1 in which said load carrying means is connected to a drill string and bit movable upward and downward in a bore hole; said electronic means including selectively connectable means for indicating the position of said drill bit, said selectively connectable means including switch means between said means to receive said pulses and said means indicating the position to said drill bit.

5. The invention according to claim 1 in which said load carrying means is connectable to a drill string and bit movable upward and downward in a bore hole, said electronic means including selectively connectable means for indicating the penetration rate of said bit, said last mentioned means including clock means operable by said pulses, to convert the downward movement of the bit to distance per unit time.

6. The invention according to claims 1, 2 or 3 which includes a direction selector in said electronic means, each of said sensors being operatively connected to said selector, said selector sensing the direction of travel of said rotating member.

7. The invention according to claims 4 or 5 which includes a direction selector in said electronic means, each of said sensors being operatively connected to said selector, said selector sensing the direction of travel of said rotating means.

8. The device according to claims 1, 2 or 3 in which said sensors comprise magnetic pick-up devices, said sensor actuating means on said rotating member including at least two spaced apart sensor actuators extending radially from said rotatable member, each actuator passing said pick-up device in operative relationship thereto.

9. The device according to claims 4 or 5 in which said sensors comprise magnetic pick-up devices, said sensor actuating means on said rotating member including at least two spaced apart sensor actuators extending radially from said rotatable member, each actuator passing said pick-up device in operative relationship thereto.

10. The device according to claims 1, 2 or 3 in which said sensors each comprise a magnetic sensor, said sensor actuating means each comprising a ferro-magnetic element secured to and rotatable co-axially with said rotating member and having discontinuities therein, and being in operable relationship with said magnetic sensors.

11. The device according to claims 4 or 5 in which said sensors each comprise a magnetic sensor, said sensor actuating means comprising a ferro-magnetic element secured to and rotatable co-axially with said rotating member having discontinuities therein, and being in operable relationship with said magnetic sensor.

12. The indicating means according to claim 2 which includes relay means operatively connected to said further comparator and being operable when said pre-selected uppermost and lowermost positions are reached by said load carrying member.

13. Indicating means according to claim 12 which includes an operator selectable by-pass clock operatively connected to said relay means for disabling same after a preset time on said by-pass clock has passed.

* * * * *